(12) United States Patent
Ruggiero et al.

(10) Patent No.: US 9,988,065 B2
(45) Date of Patent: Jun. 5, 2018

(54) SUSPENSION SYSTEM FOR ABSORBING A SHOCK LOAD AND STROLLER THEREWITH

(71) Applicants: Anthony V. Ruggiero, Downingtown, PA (US); Robert E. Haut, Merion Station, PA (US)

(72) Inventors: Anthony V. Ruggiero, Downingtown, PA (US); Robert E. Haut, Merion Station, PA (US)

(73) Assignee: Wonderland Switzerland AG, Steinhausen (CH)

( * ) Notice: Subject to any disclaimer, the term of this patent is extended or adjusted under 35 U.S.C. 154(b) by 186 days.

(21) Appl. No.: 15/241,089

(22) Filed: Aug. 19, 2016

(65) Prior Publication Data

US 2017/0050662 A1 Feb. 23, 2017

Related U.S. Application Data

(60) Provisional application No. 62/207,719, filed on Aug. 20, 2015.

(51) Int. Cl.
*B62B 9/00* (2006.01)
*B62B 7/04* (2006.01)
*B60G 3/00* (2006.01)

(52) U.S. Cl.
CPC .................. *B62B 9/00* (2013.01); *B60G 3/00* (2013.01); *B62B 7/044* (2013.01); *B62B 2301/20* (2013.01)

(58) Field of Classification Search
CPC ....... B62B 9/00; B62B 7/044; B62B 2301/20; B62B 9/18; Y10T 16/212; B60B 33/045; B60G 3/00

See application file for complete search history.

(56) References Cited

U.S. PATENT DOCUMENTS

| | | | | |
|---|---|---|---|---|
| 2,942,290 A | * | 6/1960 | Segal | ..................... B60B 33/021 |
| | | | | 16/35 R |
| 3,692,323 A | * | 9/1972 | Sekine | ...................... B62B 7/08 |
| | | | | 280/124.127 |
| 4,637,093 A | * | 1/1987 | Kassai | ................ B60B 33/0078 |
| | | | | 16/35 R |

(Continued)

FOREIGN PATENT DOCUMENTS

| CN | 201951534 U | 8/2011 |
|---|---|---|
| CN | 203581057 U | 5/2014 |

(Continued)

*Primary Examiner* — Paul N Dickson
*Assistant Examiner* — Timothy Wilhelm
(74) *Attorney, Agent, or Firm* — Winston Hsu

(57) ABSTRACT

A suspension system includes a main pivot housing, a swing arm housing, a linkage assembly, and a resilient component. The main pivot housing is disposed on a lower end of a leg of a stroller. An accommodating space is formed inside the main pivot housing. The swing arm housing is pivoted to a side of the main pivot housing. A wheel of the stroller is pivoted to the swing arm housing. The linkage assembly is movably disposed in the accommodating space. The resilient component is disposed between the linkage assembly and a bracket of the stroller. The swing arm housing can be forced to drive the linkage assembly to pivot relative to the main pivot housing for compressing the resilient component, so as to absorb a shock load.

23 Claims, 4 Drawing Sheets

(56) References Cited

U.S. PATENT DOCUMENTS

| | | | | |
|---|---|---|---|---|
| 4,649,595 | A * | 3/1987 | Shane | B60B 33/0042 16/18 CG |
| 4,847,945 | A * | 7/1989 | Schwartz | B60B 33/0078 16/30 |
| 5,305,496 | A * | 4/1994 | Gagnon | B60B 33/0042 16/44 |
| 5,967,535 | A * | 10/1999 | King | B60B 33/0002 16/35 R |
| 6,484,359 | B1 * | 11/2002 | Guttmann | B60B 33/045 16/18 R |
| 6,539,578 | B1 * | 4/2003 | Guttmann | B60B 33/0018 16/44 |
| 6,568,030 | B1 * | 5/2003 | Watanabe | B60B 33/045 16/19 |
| 6,607,201 | B2 * | 8/2003 | Marshburn | B60B 33/045 16/44 |
| 6,758,534 | B2 * | 7/2004 | Lampugnani | B60B 33/045 16/44 |
| 6,789,810 | B2 * | 9/2004 | Strong | B60B 33/045 16/18 R |
| 7,523,954 | B2 * | 4/2009 | Dotsey | B62B 7/08 280/47.38 |
| 8,490,531 | B2 * | 7/2013 | Simula | F41H 11/30 16/45 |
| 8,607,414 | B1 * | 12/2013 | Kinsela | B60B 33/045 16/35 D |
| 8,967,647 | B1 * | 3/2015 | Bastien | B62B 9/18 280/124.127 |
| 9,132,849 | B2 * | 9/2015 | Jane Santamaria | B62B 9/18 |
| 9,498,099 | B2 * | 11/2016 | Shinier | A47L 11/24 |
| 9,586,607 | B2 * | 3/2017 | Laffan | B62B 9/18 |
| 2001/0013688 | A1 * | 8/2001 | Warner, Jr. | B62B 7/08 280/47.38 |
| 2002/0096857 | A1 * | 7/2002 | Valdez | B62B 7/12 280/293 |
| 2005/0006863 | A1 * | 1/2005 | Ageneau | B62B 7/04 280/47.38 |
| 2006/0117524 | A1 * | 6/2006 | Yan | B60B 33/045 16/44 |
| 2007/0143957 | A1 * | 6/2007 | Baek | B60B 33/045 16/44 |
| 2011/0068555 | A1 * | 3/2011 | Hoag | B62B 7/126 280/283 |
| 2012/0242050 | A1 * | 9/2012 | Schroeder | B60B 5/02 280/29 |

FOREIGN PATENT DOCUMENTS

| | | |
|---|---|---|
| EP | 2 020 360 A2 | 2/2009 |
| GB | 2473119 A | 3/2011 |
| WO | 2004052662 A1 | 6/2004 |

* cited by examiner

SUSPENSION SYSTEM FOR ABSORBING A SHOCK LOAD AND STROLLER THEREWITH

CROSS REFERENCE TO RELATED APPLICATIONS

This application claims the benefit of U.S. Provisional Patent Application No. 62/207,719 filed on Aug. 20, 2015, which is hereby incorporated by reference in its entirety.

BACKGROUND OF THE INVENTION

1. Field of the Invention

The present invention relates to a suspension system adapted for a stroller and the stroller therewith, and more particularly, to a suspension system adapted for a stroller and the stroller therewith which provides a dampening effect to absorb the shock load during the stroller travels over uneven surfaces, so as to enhance sitting comfort and prevent damage of the stroller.

2. Description of the Prior Art

Strollers provide a convenient way to transport infants or children. Comfort for children while sitting thereon is of the upmost importance. However, traveling over uneven surfaces may cause discomfort for the child. Also, repeated traveling over irregular surfaces may cause damage to the stroller. Therefore, parents begin to recognize the importance of suspension on the stroller.

A conventional suspension system usually includes a cantilevered wheel whose axle is not in line with a rear leg, and a spring component disposed behind the rear leg. However, such configuration may cause interference between the suspension system and a brake system. In order to solve the aforementioned problem, there is another conventional suspension system of disposing a wheel axle and a rear leg in line and a spring component in front of the rear leg. However, such suspension system cannot provide a dampening effect comparable to that of the conventional suspension system including a cantilevered wheel for the stroller.

SUMMARY OF THE INVENTION

Therefore, an objective of the present invention is to provide a suspension system adapted for a stroller and the stroller therewith for solving the aforementioned drawbacks.

In order to achieve the aforementioned objective, a suspension system adapted for a leg of a stroller and for absorbing a shock load is disclosed. The suspension system includes a main pivot housing, at least one swing arm housing, a linkage assembly, and a resilient component. The main pivot housing is disposed on a lower end of the leg of the stroller. An accommodating space is formed inside the main pivot housing. The at least one swing arm housing is pivoted to at least one side of the main pivot housing. A wheel of the stroller is pivoted to the at least one swing arm housing. The linkage assembly is movably disposed in the accommodating space. An end of the linkage assembly is pivoted to the main pivot housing and installed on the at least one swing arm housing, and another end of the linkage assembly is pivoted to the at least one swing arm housing and slidably installed on the main pivot housing. An end of the resilient component is pivoted to the other end of the linkage assembly, and the other end of the resilient component is coupled to a bracket between the leg and a bottom tube of the stroller. When the at least one swing arm housing rotates relative to the main pivot housing, the at least one swing arm housing drives the linkage assembly to pivot relative to the main pivot housing, so that the resilient component is compressed by the linkage assembly to absorb the shock load.

Preferably, the linkage assembly includes a first linkage component and a second linkage component. The first linkage component has a first end and a second end. The first end is pivoted to the main pivot housing and slidably installed on the at least one swing arm housing, and the second end is pivoted to the resilient component. The second linkage component has a third end and a fourth end. The third end is pivoted to the at least one swing arm housing and slidably installed on the main pivot housing, and the fourth end is pivoted to a middle portion between the first end and the second end of the first linkage component.

Specifically, the suspension system further includes a first pivot shaft passing through the first end of the first linkage component, the main pivot housing and the at least one swing arm housing.

More specifically, a first sliding slot is formed on the at least one swing arm housing, and the first pivot shaft slidably passes through the first sliding slot, so that the first linkage component is slidable relative to the at least one swing arm housing by cooperation of the first pivot shaft and the first sliding slot.

Specifically, the suspension system further includes a second pivot shaft passing through the third end of the second linkage component, the main pivot housing, and the at least one swing arm housing.

More specifically, a second sliding slot is formed on the main pivot housing, and the second pivot shaft slidably passes through the second sliding slot, so that the second linkage component is slidable relative to the main pivot housing by cooperation of the second pivot shaft and the second sliding slot.

Preferably, the first linking component is substantially formed in an L shape, and the fourth end of the second linkage component is pivoted to a turning point of the first linking component.

Preferably, the at least one swing arm housing is substantially formed in a triangular shape and has a first peak portion, a second peak portion, and a third peak portion. The first peak portion of the at least one swing arm housing is pivoted to the main pivot housing. The wheel is pivoted to the second peak portion of the at least one swing arm housing, and the third peak portion of the at least one swing arm housing is slidably connected to the main pivot housing.

Preferably, an avoiding section is formed on the main pivot housing and located in a position corresponding to the second peak portion of the at least one swing arm housing, and the avoiding section allows the at least one swing arm housing to rotate relative to the main pivot housing without any interference.

In order to achieve the aforementioned objective, a stroller capable of absorbing a shock load is disclosed. The stroller includes at least one leg, at least one bottom tube, at least one wheel, at least one bracket, and at least one suspension system. The at least one wheel is rotatably disposed on the at least one leg. The at least one bracket is connected to the at least one leg and the at least one bottom tube. The at least one suspension system includes a main pivot housing, at least one swing arm housing, a linkage assembly, and a resilient component. The main pivot housing is disposed on the lower end of the at least one leg. An accommodating space is formed inside the main pivot housing. The at least one swing arm housing is pivoted to at least one side of the main pivot housing. The at least one wheel is pivoted to the at least one swing arm housing. The linkage assembly is movably disposed in the accommodating space. An end of the linkage assembly is pivoted to the main pivot housing and installed on the at least one swing arm housing, and another end of the linkage assembly is pivoted to the at least one swing arm housing and slidably installed on the main pivot housing. An end of the resilient component is pivoted to the other end of the linkage assembly, and the other end of the resilient component is coupled to the at least one bracket. When the at least one swing arm housing rotates relative to the main pivot housing, the at least one swing arm housing drives the linkage assembly to pivot relative to the main pivot housing, so that the resilient component is compressed by the linkage assembly to absorb the shock load.

Preferably, the at least one leg includes two rear legs. The at least one wheel includes two rear wheels. The at least one suspension system includes two suspension systems, and each of the two suspension systems is disposed between the corresponding rear wheel and the corresponding rear leg.

In summary, the present invention utilizes the swing arm housing for driving the linkage assembly to compress the resilient component when the swing arm housing pivot relative to the main pivot housing. Therefore, it provides an ideal dampening effect for the stroller to absorb the shock load during the stroller travels over uneven surfaces, which enhances sitting comfort and prevents damage of the stroller. Furthermore, since a novel linkage structure is provided, the benefits of adjusting the spring ratio can be achieved. Also, an axle of wheel and the leg are in line and the resilient component is positioned in front of the leg, thereby preventing the interference between the suspension system and a brake system of the stroller and providing an easy access for user to operate the brake system.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
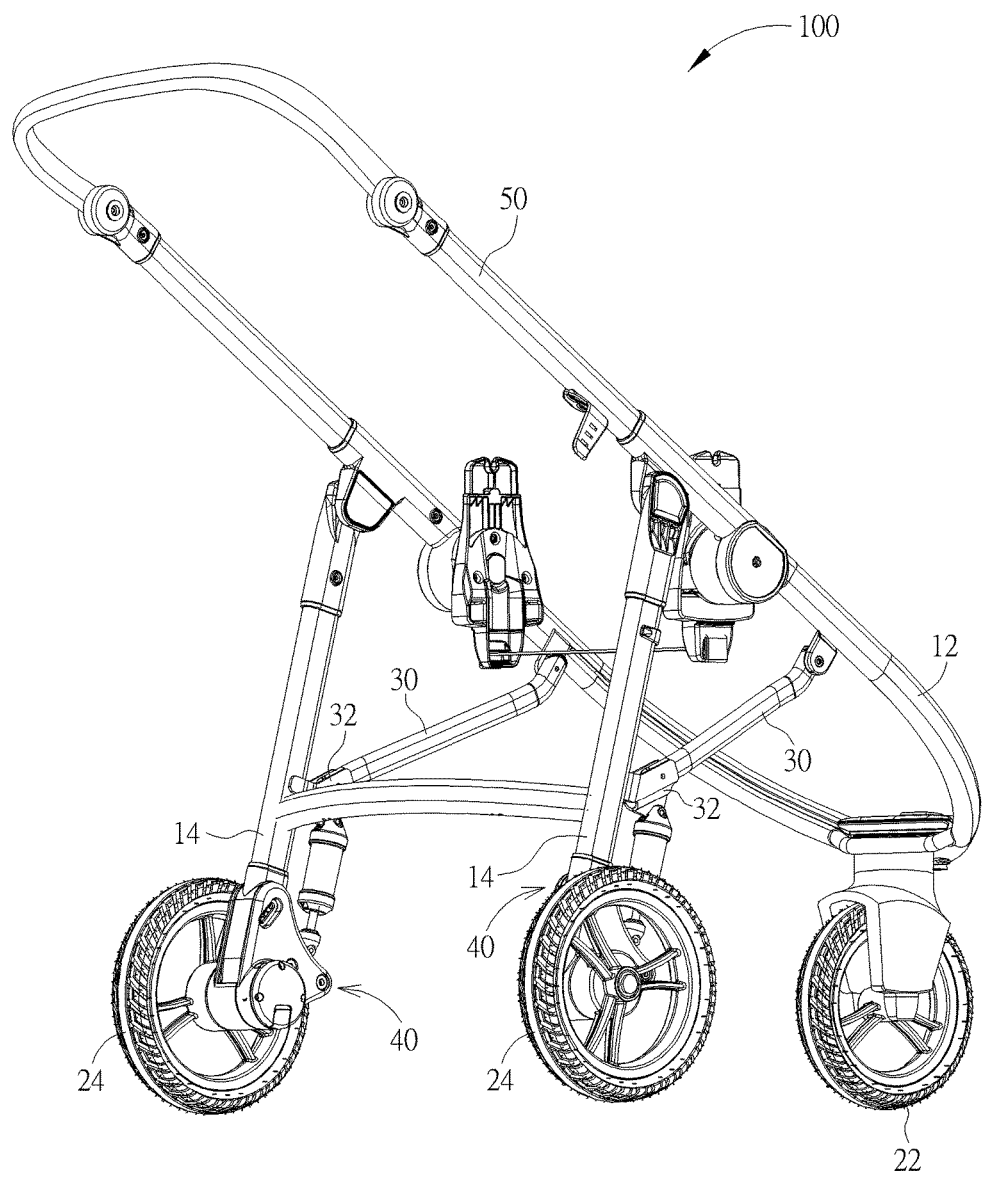
FIG. 1 is a schematic diagram of a stroller according to an embodiment of the present invention.

Please refer to FIG. 1. FIG. 1 is a schematic diagram of a stroller 100 according to an embodiment of the present invention. As shown in FIG. 1, the stroller 100 includes a front leg 12, two rear legs 14, a front wheel 22, two rear wheels 24, two bottom tubes 30, two brackets 32, two suspension systems 40, and a handle 50. The front leg 12 is pivoted to the handle 50. The two rear legs 14 are pivoted to the handle 50. Each of the two bottom tubes 30 is connected between the front leg 12 and the corresponding bracket 32. Each of the two brackets 32 is welded to the corresponding rear leg 14 and pivoted to the corresponding bottom tube 30. The front wheel 22 is rotatably disposed on the front leg 12. The two rear wheels 24 are rotatably disposed on the two rear legs 14, respectively. Each of the two suspension systems 40 is disposed between the corresponding rear leg 14 and the corresponding rear wheel 24. However, the number and the configuration of the front leg 12, the rear leg 14, the front wheel 22, the rear wheel 24, the bottom tube 30, the bracket 32, and the suspension system 40 are not limited to those illustrated in figures of this embodiment. For example, the stroller 100 also can include two front legs 12 and two front wheels 22, and four suspension systems 40. The four suspension systems 40 can be disposed between the front legs 12 and the front wheels 22 and between the rear legs 14 and the rear wheels 24, respectively.

Figure 2:
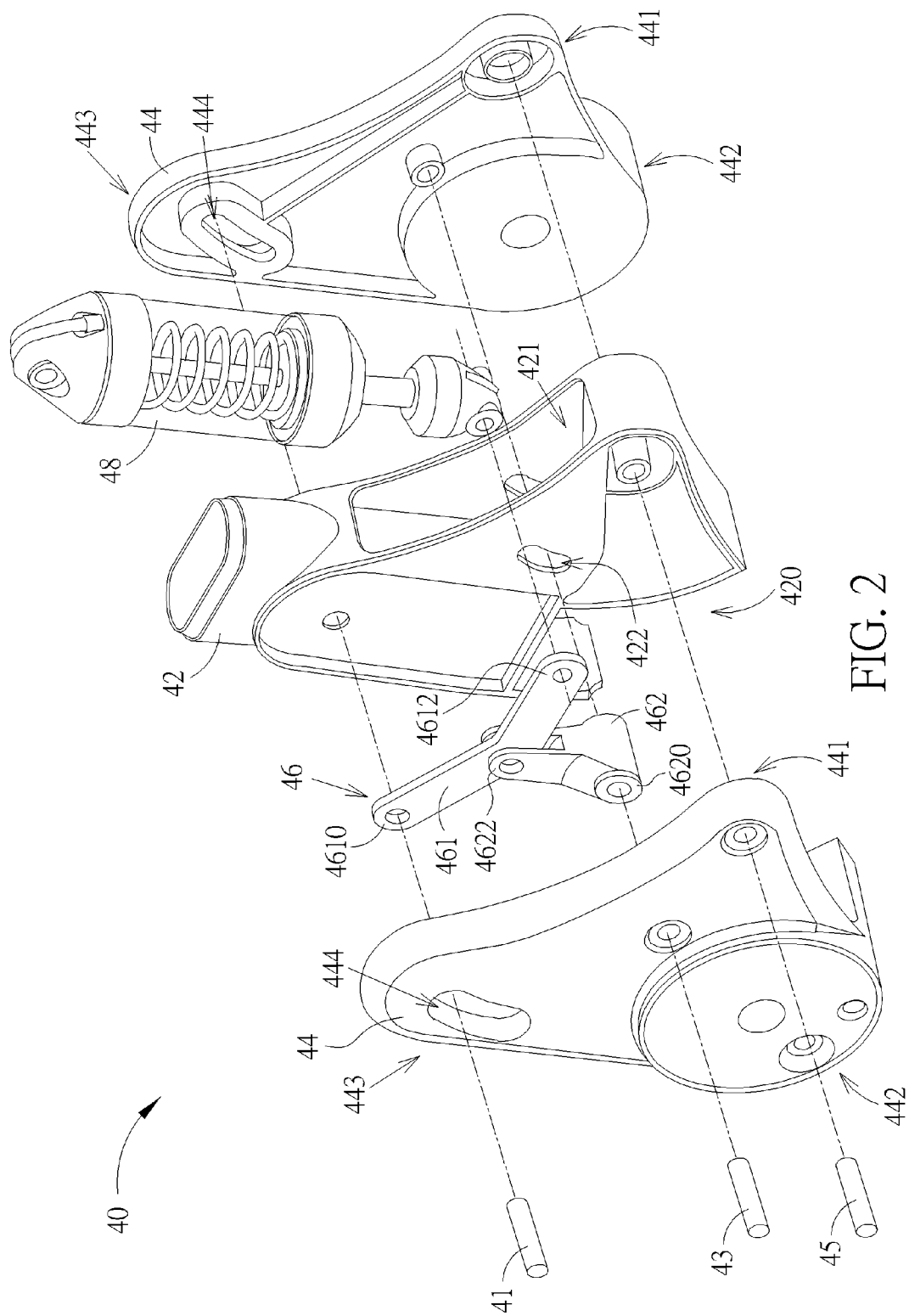
FIG. 2 is an exploded diagram of a suspension system according to the embodiment of the present invention.

Please refer to FIG. 1 and FIG. 2. FIG. 2 is an exploded diagram of the suspension system 40 according to the embodiment of the present invention. As shown in FIG. 1 and FIG. 2, each of the two suspension systems 40 includes a main pivot housing 42, two swing arm housings 44, a linkage assembly 46, and a resilient component 48. The main pivot housing 42 is disposed on a lower end of the rear leg 14. Specifically, the main pivot housing 42 is sleeved on the lower end of the rear leg 14. The two swing arm housings 44 are pivoted to two opposite sides of the main pivot housing 42. The rear wheel 24 is pivoted to the two swing arm housings 44. However, it is not limited to this embodiment. In another embodiment, the suspension system 40 also can include one swing arm housing 44 disposed on pivoted to a side of the main pivot housing 42.

Preferably, in this embodiment, each of the two swing arm housings 44 is substantially formed in a triangular shape and has a first peak portion 441, a second peak portion 442, and a third peak portion 443. The first peak portions 441 of the two swing arm housings 44 are pivoted to the main pivot housing 42. The rear wheel 24 is pivoted to the second peak portions 442 of the two swing arm housings 44, and the third peak portions 443 of the two swing arm housings 44 are slidably connected to the main pivot housing 42. Besides, an avoiding section 420 is formed on the main pivot housing 42 and located in a position corresponding to the second peak portions 442 of the two swing arm housings 44, and a hub of the rear wheel 24 is movably disposed in the avoiding section 420, so that the two swing arm housings 44 can be driven by the rear wheel 24 to rotate relative to the main pivot housing 42 without any interference.

Furthermore, an accommodating space 421 is formed inside the main pivot housing 42. The linkage assembly 46 is movably disposed in the accommodating space 421. An end of the linkage assembly 46 is pivoted to the main pivot housing 42 and installed on the two swing arm housings 44, and another end of the linkage assembly 46 is pivoted to the two swing arm housings 44 and slidably installed on the main pivot housing 42. An end of the resilient component 48 is pivoted to the other end of the linkage assembly 46, and the other end of the resilient component 48 is coupled to the bracket 32.

Specifically, the linkage assembly 46 includes a first linkage component 461 and a second linkage component 462. The first linkage component 461 has a first end 4610 and a second end 4612. The second linkage component 462 has a third end 4620 and a fourth end 4622. In an embodiment, the first end 4610 of the first linkage component 461 is pivoted to the main pivot housing 42 and slidably installed on the two swing arm housings 44, and the second end 4612 is pivoted to the resilient component 48. The third end 4620 of the second linkage component 462 is pivoted to the two swing arm housings 44 and slidably installed on the main pivot housing 42. The fourth end 4622 of the second linkage component 462 is pivoted to a middle portion between the first end 4610 and the second end 4612 of the first linkage component 461. Preferably, in this embodiment, the first linking component 461 can be substantially formed in an L shape, and the fourth end 4622 of the second linkage component 462 is pivoted to a turning point of the first linking component 461. However, structures of the first linkage component 461 and the second linkage component 462 are not limited to those illustrated in figures of this embodiment. It depends on practical demands.

Preferably, the suspension system. 40 further includes a first pivot shaft 41 and a second pivot shaft 43, and a third pivot shaft 45. A first sliding slot 444 is formed on each of the two swing arm housings 44. The first pivot shaft 41 passes through one of the two first sliding slots 444, the main pivot housing 42, the first end 4610 of the first linkage component 461, and the other first sliding slot 444 sequentially. A second sliding slot 422 is formed on the main pivot housing 42. The second pivot shaft 43 passes through one of the two swing arm housings 44, the second sliding slot 422 of the main pivot housing 42, the third end 4620 of the second linkage component 462, and the other swing arm housing 44 sequentially. The third pivot shaft 45 is for pivotally connecting the two swing arm housing 44 and the main pivot housing 42. In such a way, the first linkage component 461 is slidable relative to the two swing arm housings 44, and the second linkage component 462 is slidable relative to the main pivot housing 42. In other words, by the cooperation of the first pivot shaft 41 and the first sliding slots 444 and the cooperation of the second pivot shaft 43 and the second sliding slot 422, the two swing arm housings 44 can pivot relative to the main pivot housing 42 around the third pivot shaft 45 and along the first sliding slots 444 to drive the second linkage component 462 to push the first linkage component 461 to pivot relative to the main pivot housing 42 around the first pivot shaft 41.

Figure 3:
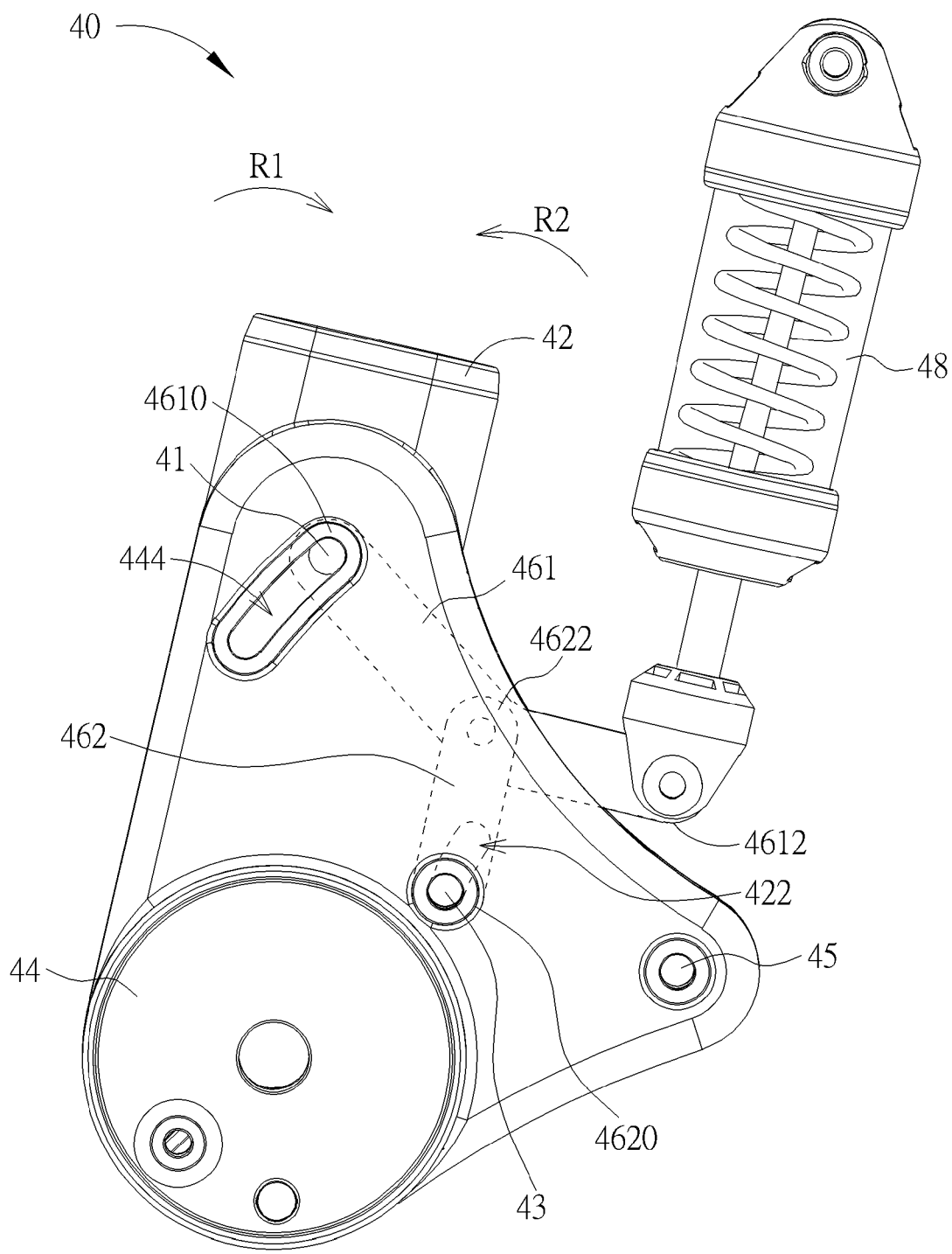
FIG. 3 and FIG. 4 are diagrams of the suspension system at different statuses according to the embodiment of the present invention.
Figure 4:
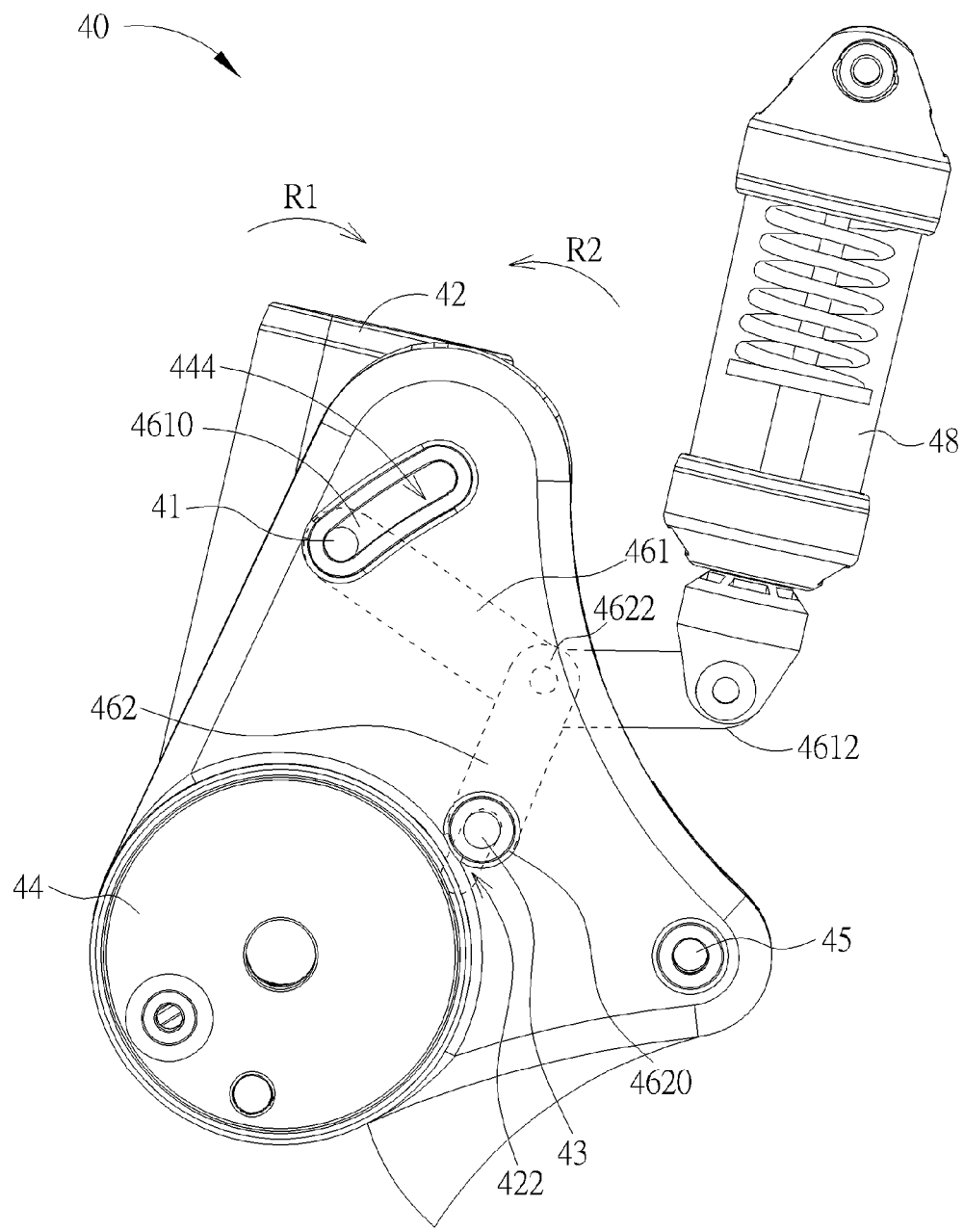

Please refer to FIG. 3 and FIG. 4. FIG. 3 and FIG. 4 are different diagrams of the suspension system 40 at different statuses according to the embodiment of the present invention. As shown in FIG. 3 and FIG. 4, when the stroller 100 travels over the uneven surfaces, the two swing arm housings 44 are forced by the rear wheel 24 to rotate relative to the main pivot housing 42 around the third pivot shaft 45 in a first pivot direction R1, and the first pivot shaft 41 slides along the first sliding slots 444, so that the fourth end 4622 of the second linkage component 462 is driven upwardly by cooperation of the second pivot shaft 43 and the second sliding slot 422 of the main pivot housing 42, so as to push the first linkage component 461 to pivot around the first pivot shaft 41 in a second pivot direction R2 opposite to the first pivot direction R1. Therefore, the resilient component 48 is compressed by the second end 4612 of the first linkage component 461 to generate a recovering force, which can dampen a shock load from the rear wheel 24. During the aforementioned process, the suspension system 40 transforms from a status, which is shown in FIG. 3, to the other status, which is shown in FIG. 4.

Afterwards, the compressed resilient component 48 recovers the second end 4612 of the first linkage component 461 to pivot relative to the main pivot housing 42 around the first pivot shaft 41 along the first pivot direction R1, so that the fourth end 4622 of the second linkage component 462 is driven to move downwardly by the first linkage component 461 and cooperation of the second pivot shaft 43 and the second sliding slot 422 of the main pivot housing 42. Therefore, the two swing arm housings 44 are driven by the second linkage component 462 to pivot relative to the main pivot housing 42 in the second pivot direction R2, and the first pivot shaft 41 slides along the first sliding slots 444 reversely. During the aforementioned process, the suspension system 40 recovers from the other status, which is shown in FIG. 4, to the status, which shown in FIG. 3. In other words, the suspension system 40 can switch between the different statuses, which are shown in FIG. 3 and FIG. 4, for absorbing the shock load when the stroller 100 travels over the uneven surfaces. Therefore, it provides a dampening effect for the stroller 100.

In contrast to the prior art, the present invention utilizes the swing arm housing for driving the linkage assembly to compress the resilient component when the swing arm housing pivot relative to the main pivot housing. Therefore, it provides an ideal dampening effect for the stroller to absorb the shock load during the stroller travels over uneven surfaces, which enhances sitting comfort and prevents damage of the stroller. Furthermore, since a novel linkage structure is provided, the benefits of adjusting the spring ratio can be achieved. Also, an axle of wheel and the leg are in line and the resilient component is positioned in front of the leg, thereby preventing the interference between the suspension system and a brake system of the stroller and providing an easy access for user to operate the brake system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A suspension system adapted for a leg of a stroller and for absorbing a shock load, the suspension system comprising:
   a main pivot housing disposed on a lower end of the leg of the stroller, an accommodating space being formed inside the main pivot housing;
   at least one swing arm housing pivoted to at least one side of the main pivot housing, a wheel of the stroller being pivoted to the at least one swing arm housing;
   a linkage assembly movably disposed in the accommodating space, an end of the linkage assembly being pivoted to the main pivot housing and installed on the at least one swing arm housing, and another end of the linkage assembly being pivoted to the at least one swing arm housing and slidably installed on the main pivot housing; and
   a resilient component, an end of the resilient component being pivoted to the other end of the linkage assembly, and the other end of the resilient component being coupled to a bracket between the leg and a bottom tube of the stroller;
   wherein when the at least one swing arm housing rotates relative to the main pivot housing, the at least one swing arm housing drives the linkage assembly to pivot relative to the main pivot housing, so that the resilient component is compressed by the linkage assembly to absorb the shock load.

2. The suspension system of claim 1, wherein the linkage assembly comprises:
   a first linkage component having a first end and a second end, the first end being pivoted to the main pivot housing and slidably installed on the at least one swing arm housing, and the second end being pivoted to the resilient component; and
   a second linkage component having a third end and a fourth end, the third end being pivoted to the at least one swing arm housing and slidably installed on the main pivot housing, and the fourth end being pivoted to a middle portion between the first end and the second end of the first linkage component.

3. The suspension system of claim 2, further comprising a first pivot shaft passing through the first end of the first linkage component, the main pivot housing and the at least one swing arm housing.

4. The suspension system of claim 3, wherein a first sliding slot is formed on the at least one swing arm housing, and the first pivot shaft slidably passes through the first sliding slot, so that the first linkage component is slidable relative to the at least one swing arm housing by cooperation of the first pivot shaft and the first sliding slot.

5. The suspension system of claim 3, further comprising a second pivot shaft passing through the third end of the second linkage component, the main pivot housing, and the at least one swing arm housing.

6. The suspension system of claim 5, wherein a second sliding slot is formed on the main pivot housing, and the second pivot shaft slidably passes through the second sliding slot, so that the second linkage component is slidable relative to the main pivot housing by cooperation of the second pivot shaft and the second sliding slot.

7. The suspension system of claim 2, wherein the first linkage component is substantially formed in an L shape, and the fourth end of the second linkage component is pivoted to a turning point of the first linkage component.

8. The suspension system of claim 1, wherein the at least one swing arm housing is substantially formed in a triangular shape and has a first peak portion, a second peak portion, and a third peak portion, the first peak portion of the at least one swing arm housing is pivoted to the main pivot housing, the wheel is pivoted to the second peak portion of the at least one swing arm housing, and the third peak portion of the at least one swing arm housing is slidably connected to the main pivot housing.

9. The suspension system of claim 8, wherein an avoiding section is formed on the main pivot housing and located in a position corresponding to the second peak portion of the at least one swing arm housing, and the avoiding section allows the at least one swing arm housing to rotate relative to the main pivot housing without any interference.

10. The suspension system of claim 1, wherein the main pivot housing is sleeved on the lower end of the leg, and the bracket is pivoted to the bottom tube.

11. The suspension system of claim 1, wherein the at least one swing arm housing comprises two swing arm housings pivoted to two opposite sides of the main pivot housing.

12. A stroller capable of absorbing a shock load, the stroller comprising:
    at least one leg;
    at least one bottom tube;
    at least one wheel rotatably disposed on the at least one leg;
    at least one bracket connected to the at least one leg and the at least one bottom tube; and
    at least one suspension system disposed between the at least one leg and the at least one wheel, the at least one suspension system comprising:
        a main pivot housing disposed on a lower end of the at least one leg, an accommodating space being formed inside the main pivot housing;
        at least one swing arm housing pivoted to at least one side of the main pivot housing, the at least one wheel of the stroller being pivoted to the at least one swing arm housing;
        a linkage assembly movably disposed in the accommodating space, an end of the linkage assembly being pivoted to the main pivot housing and installed on the at least one swing arm housing, and another end of the linkage assembly being pivoted to the at least one swing arm housing and slidably installed on the main pivot housing; and
        a resilient component, an end of the resilient component being pivoted to the other end of the linkage assembly, and the other end of the resilient component being coupled to the at least one bracket;
    wherein when the at least one swing arm housing rotates relative to the main pivot housing, the at least one swing arm housing drives the linkage assembly to pivot relative to the main pivot housing, so that the resilient component is compressed by the linkage assembly to absorb the shock load.

13. The stroller of claim 12, wherein the linkage assembly comprises:
    a first linkage component having a first end and a second end, the first end being pivoted to the main pivot housing and slidably installed on the at least one swing arm housing, and the second end being pivoted to the resilient component; and
    a second linkage component having a third end and a fourth end, the third end being pivoted to the at least one swing arm housing and slidably installed on the main pivot housing, and the fourth end being pivoted to a middle portion between the first end and the second end of the first linkage component.

14. The stroller of claim 13, further comprising a first pivot shaft passing through the first end of the first linkage component, the main pivot housing and the at least one swing arm housing.

15. The stroller of claim 14, wherein a first sliding slot is formed on the at least one swing arm housing, and the first pivot shaft slidably passes through the first sliding slot, so that the first linkage component is slidable relative to the at least one swing arm housing by cooperation of the first pivot shaft and the first sliding slot.

16. The stroller of claim 14, further comprising a second pivot shaft passing through the third end of the second linkage component, the main pivot housing, and the at least one swing arm housing.

17. The stroller of claim 16, wherein a second sliding slot is formed on the main pivot housing, and the second pivot shaft slidably passes through the second sliding slot, so that the second linkage component is slidable relative to the main pivot housing by cooperation of the second pivot shaft and the second sliding slot.

18. The stroller of claim 13, wherein the first linking component is substantially formed in an L shape, and the fourth end of the second linkage component is pivoted to a turning point of the first linking component.

19. The stroller of claim 12, wherein the at least one swing arm housing is substantially formed in a triangular shape and has a first peak portion, a second peak portion, and a third peak portion, the first peak portion of the at least one swing arm housing is pivoted to the main pivot housing, and the at least one wheel is pivoted to the second peak portion of the at least one swing arm housing.

20. The stroller of claim 19, wherein an avoiding section is formed on the main pivot housing and location in a position corresponding to the second peak portion of the at least one swing arm housing, and the avoiding section allows the at least one swing arm housing to rotate relative to the main pivot housing without any interference.

21. The stroller of claim 12, wherein the main pivot housing is sleeved on the lower end of the at least one leg, and the bracket is pivoted to the bottom tube.

22. The stroller of claim 12, wherein the at least one swing arm housing comprises two swing arm housings pivoted to two opposite sides of the main pivot housing.

23. The stroller of claim 12, wherein the at least one leg comprises two rear legs, the at least one wheel comprises two rear wheels, the at least one suspension system comprises two suspension systems, and each of the two suspension systems is disposed between the corresponding rear wheel and the corresponding rear leg.

* * * * *